United States Patent [19]

Yost

[11] 4,306,968
[45] Dec. 22, 1981

[54] SEWAGE TREATMENT SYSTEM

[75] Inventor: Kenneth J. Yost, Eaton, Ohio

[73] Assignee: McNeil Corporation, Akron, Ohio

[21] Appl. No.: 142,319

[22] Filed: Apr. 21, 1980

Related U.S. Application Data

[63] Continuation of Ser. No. 950,146, Oct. 10, 1978, abandoned.

[51] Int. Cl.³ .............................................. C02F 3/24
[52] U.S. Cl. ................................. 210/194; 210/199; 210/218; 210/220; 210/259
[58] Field of Search ....................... 55/249, 255, 256; 210/621, 622, 629, 758, 765, 194, 195.1, 199, 218, 220, 221.1, 259, 198.1; 261/77, 119 R, 121 R

[56] References Cited

U.S. PATENT DOCUMENTS

| | | | |
|---|---|---|---|
| 1,343,797 | 6/1920 | Stott et al. | 210/14 |
| 2,015,174 | 9/1935 | Anglemyer | 55/255 X |
| 2,098,152 | 11/1937 | Kessener | 210/14 |
| 2,126,164 | 8/1938 | Anderson | 210/220 X |
| 2,138,349 | 11/1938 | Mallory | 210/220 X |
| 2,324,593 | 7/1943 | Persson et al. | 210/14 |
| 2,708,571 | 5/1955 | Fischerstrom et al. | 210/14 X |
| 2,830,947 | 4/1958 | Griffith | 210/220 X |
| 3,133,130 | 5/1964 | Lambeth | 210/220 X |
| 3,133,878 | 5/1964 | Kober | 210/220 |
| 3,173,866 | 3/1965 | Lefton et al. | 210/205 |
| 3,202,285 | 8/1965 | Williams | 210/195.1 |
| 3,236,767 | 2/1966 | Ross et al. | 210/220 X |
| 3,336,016 | 8/1967 | Schreiber | 210/220 X |
| 3,339,901 | 9/1967 | Walker | 210/220 X |
| 3,388,057 | 6/1968 | Callahan | 210/197 X |
| 3,546,110 | 12/1970 | Englesson et al. | 210/221.1 X |
| 3,547,815 | 12/1970 | McWhirter | 210/220 X |
| 3,560,379 | 2/1971 | Muskat | 210/219 X |
| 3,591,492 | 7/1971 | Neuspiel | 210/195.1 X |
| 3,619,421 | 11/1971 | Hobbs et al. | 210/220 X |
| 3,706,380 | 12/1972 | LeQuinquis | 210/197 |
| 3,805,957 | 4/1974 | Oldham et al. | 210/220 X |
| 3,808,123 | 4/1974 | Neel | 210/199 X |
| 3,817,858 | 6/1974 | Yost | 210/220 X |
| 3,864,247 | 2/1975 | Fuchs | 210/195.1 X |
| 3,879,285 | 4/1975 | Yost | 210/14 |
| 3,897,000 | 7/1975 | Mandt | 210/199 X |
| 3,925,208 | 12/1975 | Yost | 210/199 |
| 3,951,804 | 4/1976 | Smith | 210/197 X |
| 3,960,717 | 6/1976 | Wyatt | 210/195.1 X |
| 3,997,437 | 12/1973 | Prince et al. | 210/220 X |

FOREIGN PATENT DOCUMENTS

| | | | |
|---|---|---|---|
| 2121153 | 11/1971 | Fed. Rep. of Germany | 210/15 |
| 2210185 | 9/1973 | Fed. Rep. of Germany | 210/220 |
| 2404198 | 8/1974 | Fed. Rep. of Germany | 210/220 |
| 722243 | 3/1932 | France | 210/197 |
| 56496 | 6/1967 | German Democratic Rep. | 210/220 |
| 7402019 | 8/1975 | Netherlands | 210/219 |
| 3831 | of 1915 | United Kingdom | 210/15 |

*Primary Examiner*—Robert H. Spitzer
*Attorney, Agent, or Firm*—Biebel, French & Nauman

[57] ABSTRACT

A sewage treatment system comprising means defining a receptacle including at least one chamber for receiving a body of sewage composed of liquid and solids the top of which is exposed to air, means for applying air, under pressure, immediately below the upper surface of said body of sewage in said one chamber, at an angle thereto to physically lift portions of said sewage from the upper surface of said body thereof in a spray form, thereby to expose said lifted portions to air and to infuse said portions with oxygen, the nature and angle of application of the air being effective at the same time to induce a current in the body of sewage having a downward spiral and an ever-decreasing velocity, said current being effective to induce suspended solids to be driven to the bottom of said chamber together with the heavy solids settled thereon, thereby to facilitate an extremely rapid aerobic digestion.

20 Claims, 6 Drawing Figures

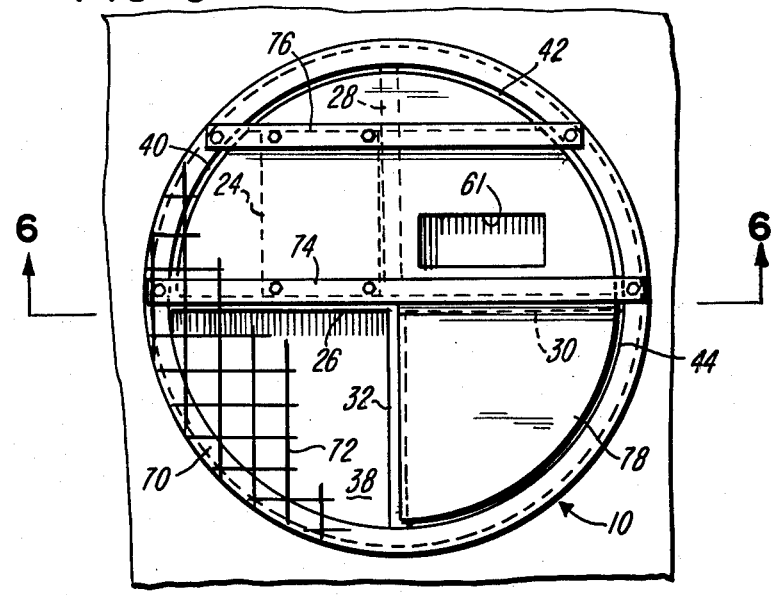
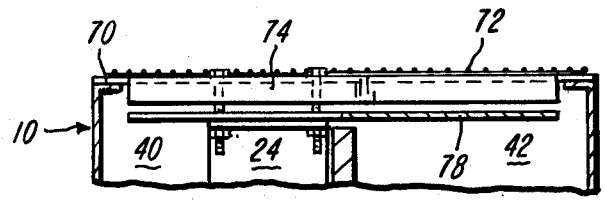

SEWAGE TREATMENT SYSTEM

This is a continuation of application Ser. No. 950,146, filed Oct. 10, 1978, now abandoned.

BACKGROUND OF THE INVENTION

This invention relates to a sewage treatment system and more particularly to a means and method for achieving aerobic digestion. Embodiments feature improved oxygenation and, at the same time, an improved and most rapid separation of the solids and the liquid content of the sewage. The invention is equally applicable to a sanitary system for a single residence, for a mobile home and for a complete community.

U.S. Pat. Nos. 3,925,208, 3,879,285 and 3,817,858 represent the most pertinent of the prior art of which those involved in the preparation of this disclosure are aware. Apart from the specifics of these patents, there have been many other proposals the objectives of which have been improvements in the field of aerobic digestion. None, however, have offered a sewage treatment system wherein there is (a) as effective an application and utilization of oxygen; (b) such a rapid separation and settling out of contained solids in a first phase treatment of raw sewage; (c) such a reduction of power requirements; and (d) the capability of achieving as clear and as potable a water product in a relatively brief interval of time as enabled by the present invention.

Further, in using conventional sewage treatment systems employing principles of aerobic digestion, it has proven to be extremely difficult, without extended and expensive treatment procedures to obtain potable water wherein visible suspended solids have virtually been eliminated. Nor has it been easy to reduce the solids embodied in sewage to a form facilitating their disposal and/or utilization.

The following examples illustrate some of the difficulties experienced in operation of conventional sewage treatment systems utilizing principles of aerobic digestion. The difficulties stem primarily from the manner in which efforts are made to expose the solids in the sewage to oxygen.

In one type of prior art system the sewage is delivered to a settling tank by way of relatively elevated nozzles, the theory being that in this way the sewage solids will be exposed to air as they drop into the tank, thereby to achieve oxygenation. A basic problem in this procedure is that the solids frequently crust and clog the delivery nozzles. The maintenance cost and down time resulting are of course obvious and the oxygenation is less than necessary to satisfy environmental needs. Also this system does not adequately achieve a separation of suspended solids from the water content of the sewage.

In another type of sewage treatment system "bubblers" are employed to drive air up and through a body of sewage. This arrangement tends to churn the sewage and to keep solids in suspension and consumes a lot of power. Moreover, when air is turned off the bubblers clog with the sewage in which they are immersed.

A third type applies a plurality of jets of air to the surface of a body of sewage in a fully enclosed chamber. The air nozzles are in this case positioned at levels above the upper surface of the sewage and directed down in an effort to produce an adequate infusion of oxygen. The rate of oxygenation in this case has proven to be insufficient to achieve the desired results. It has been proposed in using this type of system to induce circular flow patterns in the sewage surface to facilitate digestion but this also has not been found satisfactory.

There have been other systems but, as the foregoing, each has shown a serious deficiency and none have fully met environmental standards such as now required.

SUMMARY OF THE INVENTION

The invention provides a sewage treatment system a unit of which, in a preferred embodiment, comprises a tank-like receptacle having vertical partitions which define therein a plurality of circularly spaced chambers. Within, centrally of and adjacent the top of the receptacle is a blower the discharge of which exits by way of a plurality of nozzles, one of which is disposed at the upper limit of each chamber. The chambers are series related and each has a vertical entrance passage which discharges into the lower end thereof.

In use of the system a first said chamber receives raw sewage which is delivered to its bottom by way of its entrance passage. The arrangement is such that the heavier than water solids and the liquid (primarily water) content of the sewage are essentially separated, the heavier than water solids remaining at the bottom of the first chamber and the liquid and suspended lighter than water solids moving upwardly of the chamber. The entrance to the entrance passage of each chamber following the first said chamber is at a level which defines the uppermost level to which the contents of the preceding chamber may rise and is exposed and arranged to receive the contents of the preceding chamber which rises above such level. The last chamber in the series thereof provided in said receptacle discharges by way of an effluent line the entrance end of which is horizontally disposed to similarly receive overflow of its contents above the same said predetermined level.

The entrance to the effluent line, which is normally open, has a cap which embodies a filter. The latter provides means, as will be seen, insuring that the liquid discharged by way of the effluent line will be made safe for the surrounding environment, should the invention system be shut down for one reason or another.

The nozzle arrangement per the present invention provides that the discharge end of each is slightly submerged in the contents of the chamber over which it lies, at a radially innermost portion thereof. The nozzle discharge end is in each case disposed at an angle to the upper surface of such contents in the neighborhood of $37\frac{1}{2}°$ to 45°. It is preferred that the discharge end of the nozzle be arranged at a level in the neighborhood of $\frac{1}{2}''$ below the surface of the content of the chamber in which it is submerged. The result is that when air is discharged from the nozzle under pressure it has a dual function. First the air is delivered to produce a jet flow which moves under and physically lifts upper layer portions of the essentially liquid sewage in which it is submerged in a high rising spray form. The nature of the lift and the height thereof causes the relatively liquid sewage so affected to widely disperse in the form of small bubbles, primarily, and widely separated small particles. The nature of this dispersal produces a maximum exposure of this lifted sewage to air and in the course thereof substantial amounts of oxygen in the air applied to lifting purposes in infused in the bubbles and particles of sewage and carried therewith back into the body of the sewage content of said first chamber. The second function of the air and the angle of its discharge is to produce in the body of the sewage, at the upper surface portions thereof, a rotating influence which is reflected in a downwardly and spirally moving current the force effect and velocity of which is constantly decreasing from top to bottom of the sewage. The physical effect of the nature of this current is to pressure lighter than water solids above the bottom of the chamber to move to and co-mingle with the heavier than water solids. The arrangement is such that the velocity of this current is so reduced adjacent the bottom of the first chamber that it maintains the solids on and forced to the bottom thereof without perceptible disturbance by the spiralling current thereabove.

The apparatus of the invention system further incorporates an apertured cover or baffle which assists in recirculating air applied in a space defined thereby above the contents of the chambers in said receptacle and in movement of air from the surrounding environment to and from the space above the contents of the receptacle for the purpose of reducing the effect of ambient air temperature fluctuations on water temperature stability. Basically, this prevents "freeze-up" and break down of the system during periods of extreme cold weather.

It is a significant feature of the invention embodiments that there is achieved such a level of dissolved oxygen in the first said chamber of the receptacle that there is a very high degree of aerobic digestion of the raw sewage solids driven to the bottom thereof and the solid sludge at the bottom quickly reduces to a minimal volume of ash. The overall effect is facilitated by reason of the fact there is no agitation of the solids as provided in many conventional systems, which produces agglomeration and prevents a proper utilization of oxygen or even an adequate amount thereof.

In essence where a receptacle as above described and utilized is provided with a series of four chambers, the overflow from upper level of the first chamber in the series to the second chamber is relatively free of visible suspended solids. There are some visible colloidal solids but it nevertheless remains that an extremely high percentage of the suspended solids as well as the heavier than water solids of the raw sewage entering the same are removed in the first chamber. More than this, the brownish look of the liquid passing to the second chamber, as would be the case if prior art practices were utilized, is eliminated. This means that if necessary to return the discharge in the form of overflow from the first chamber to the environment, that there would be little danger. In any event, air is applied with the same effect in the second chamber to further oxygenate its contents and to drive essentially all the solids contents thereof, minimal in nature, to the bottom where the same is quickly and aerobically digested. The overflow from the second chamber is substantially clear and the repeated and similar oxygenation and application of air in successive fashion in the third chamber essentially renders potable the liquid therein which on following treatment in identical fashion in the fourth chamber results in a discharge by way of the effluent line of highly potable water. It is not essential that there be four such treatments but the results achieved thereby are far beyond that which has been achieved by systems of the prior art.

It is thus a primary object of the invention to provide a sewage treatment system utilizing aerobic digestion which is economical to fabricate and operate, more efficient and satisfactory in use and adaptable to a wide variety of applications.

Another object is to provide for a body of sewage to be oxygenated by submerging the discharge end of a nozzle slightly below its upper surface at an angle to provide that a pressured delivery of air therethrough will issue in a jet form to move under and produce a generally vertical and relatively high lift of portions of the upper layer of the sewage, the particles of which widely disperse in a spray-like configuration comprised of small bubbles wherein the lifted sewage is finely separated and maximally exposed to air and the sewage infused with oxygen which is carried back into the body of the sewage to effect a highly rapid aerobic digestion and reduction thereby of its solids content.

An additional object is to apply air under pressure to a body of sewage immediately under the upper surface thereof and at such an angle thereto to successively lift portions thereof in a high spray-like configuration for effective oxygenation and at the same time to drive suspended solids to and to maintain the same at the lower limits of the body of sewage for aerobic digestion.

An additional object is to rapidly separate a body of sewage deposited in a single chamber into relatively definite sections of solids on the one hand and water on the other and to introduce air under pressure immediately below the upper surface of the chamber contents in a manner to relatively quickly render the upper layers of the water substantially free of visible solids and relatively safe for discharge to the environment, or for re-use.

Another object of the invention is to provide a sewage treatment system and components thereof possessing the advantageous structural features, the inherent meritorious characteristics and having the means and mode of use herein described.

With the above and other incidental objects in view as will more fully appear in the specification, the invention intended to be protected by Letters Patent consist of the features of construction, the parts and combinations thereof, and the mode of operation as hereinafter described or illustrated in the accompanying drawings, or their equivalents.

Referring to the accompanying drawings wherein are shown some but obviously not necessarily the only forms of embodiment of the invention, FIG. 1 is a generally diagrammatic perspective view, shown partly in section, of one embodiment of the invention;

FIG. 5 is a top plan view, shown partly in section illustrating the modification of the embodiment of FIGS. 1-4; and FIG. 6 is a fragmentary vertical sectional view taken along line 6—6 of FIG. 5.

Like parts are indicated by similar characters of reference throughout the several views.

Figure 1:
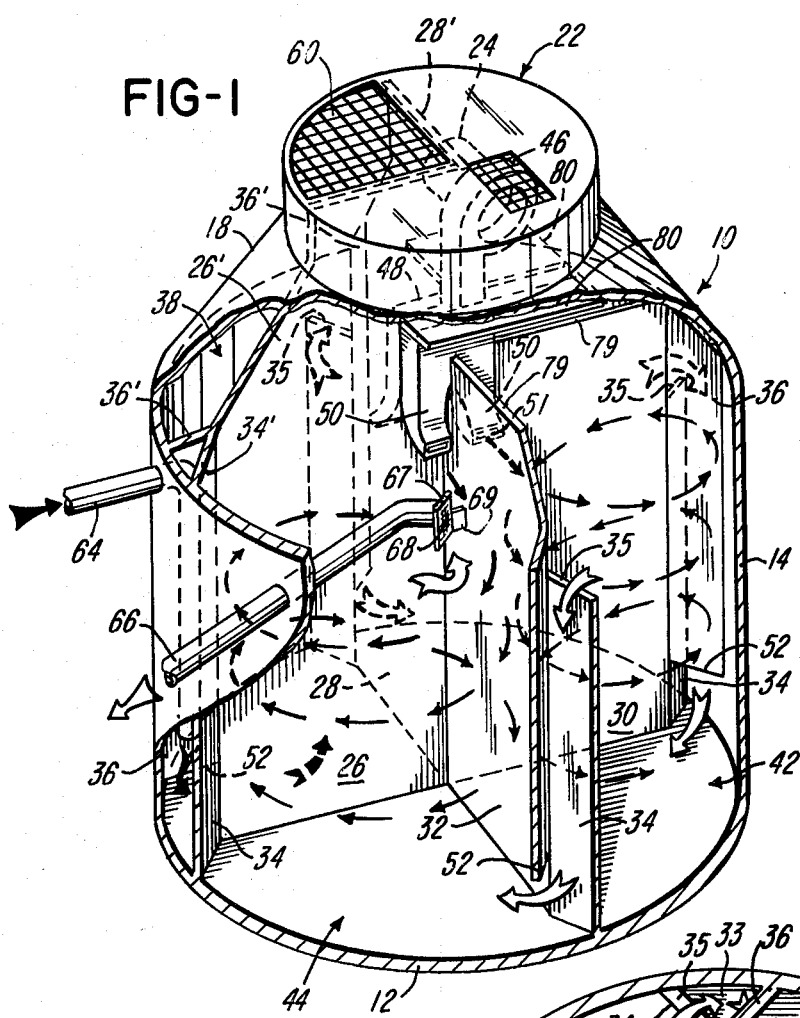

The embodiment of FIGS. 1 to 4 of the drawings comprises a tank-like receptacle 10 including a base 12 upstanding from the peripheral edge of which is a vertical wall structure 14. The wall structure 14 is a generally cylindrical shell in a direction upwardly from the base 12 to a level 16 adjacent but spaced from its upper extremity. Upwardly of the level 16 the wall structure 14 includes a short section 18 which has a conically convergent configuration. The truncated apex of the section 18 is slightly extended by a short wall section 20 which has a cylindrical configuration and rims a reduced diameter opening at the top of the tank 10.

The wall section 20 is bridged at its upper extremity by a cap-like plate structure 22. As will be seen, the plate 22 is apertured to provide for communication between the upper interior portion of the tank and the atmosphere while the imperforate portion of this plate serves as a baffle.

A blower 24 has the base thereof secured to the underside of the plate 22 to depend therefrom and dispose within the conically shaped portion of the interior of the tank 10 which is rimmed by the wall section 18.

Mounted within the lower cylindrical portion of the wall structure 14, extending perpendicular to and integrated with the base 12 at their lower end, are four plate-like wall sections 26, 28, 30 and 32. The latter radiate from the vertical center line of the tank at which the radially innermost vertical edges of these wall sections are joined and integrated. The wall sections 26, 28, 30 and 32 have their radially outermost vertical edges adjacent, parallel to and equally spaced from, but short of, the inner surface of the wall structure 14. The radially outermost vertical edges of the wall sections 26, 28, 30 and 32 are each outwardly extended by integral vertically oriented plate structures 34 and 36 which symmetrically diverge as they extend to and have their radially outermost edges integrated with the wall structure 14. As seen from the drawings, particularly FIG. 2, the wall sections 26, 28, 30 and 32 together with their connected plate extensions 36 define partitions which divide the major extent of the cylindrical area of the tank interior into four equal, generally pie-shaped chambers 38, 40, 42 and 44.

The vertical extent of the wall segments 30 and 32 provide that their upper limits lie in a common horizontal plane, designated in the drawings by the numeral 79, adjacent but spaced above the upper level 16 of the lower cylindrical portion of the wall structure 14. The plate section 26 and the connected plate 36, however, have vertical extensions 26' and 36', respectively, which reach the uppermost limit of the tank 10. The plate section 28 and the section 36 in connection therewith have similar vertical extensions to the upper reach of the tank 10. By this construction the space above the chamber 38, defined between plate sections 26 and 28, is walled in to prevent thereby its direct communication with the space over the chambers 40, 42 and 44.

The blower 24 has an inlet 23. In operation thereof it draws air from the atmosphere by way of apertures 46 in the cap plate 22, in a portion thereof which overlies the chambers 40 and 42. The outlet from the blower communicates with a chamber 48 defined in connection therewith. The chamber 48 receives air under pressure developed during operation of the blower, and directs such air, under pressure, through four outlets which commonly communicate with this chamber. The outlets from the chamber 48 are each extended by a nozzle-like projection 50.

Note, with reference to the drawings, that the structure in connection with the blower which defines the chamber 48 and the nozzles 50 depends from the blower to center immediately over the radially innermost portions of the upper edges of the wall sections 26, 28, 30 and 32. The four nozzles 50 are rectangularly spaced and arranged to project downwardly and inwardly of the radially innermost corners of the upper portions of the chambers 38, 40, 42 and 44, one extending into each chamber.

Figure 2:
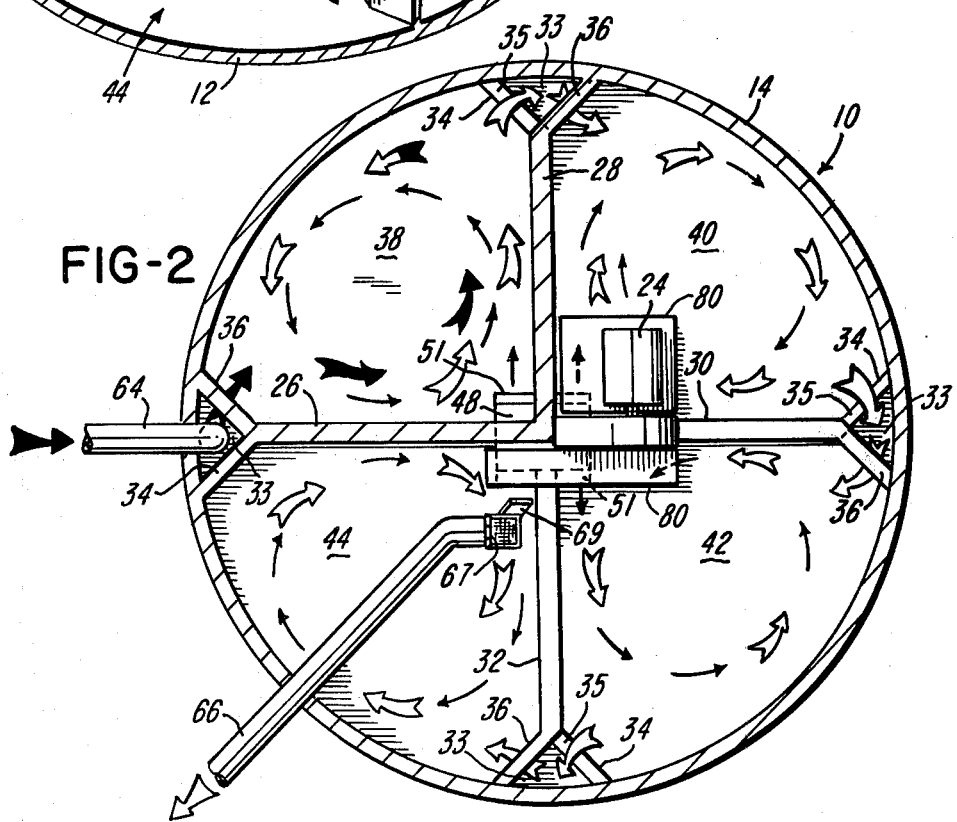
FIG. 2 is a horizontal sectional view of the structure of FIG. 1 taken adjacent the top thereof to schematically illustrate the function of the apparatus.
Figure 3:
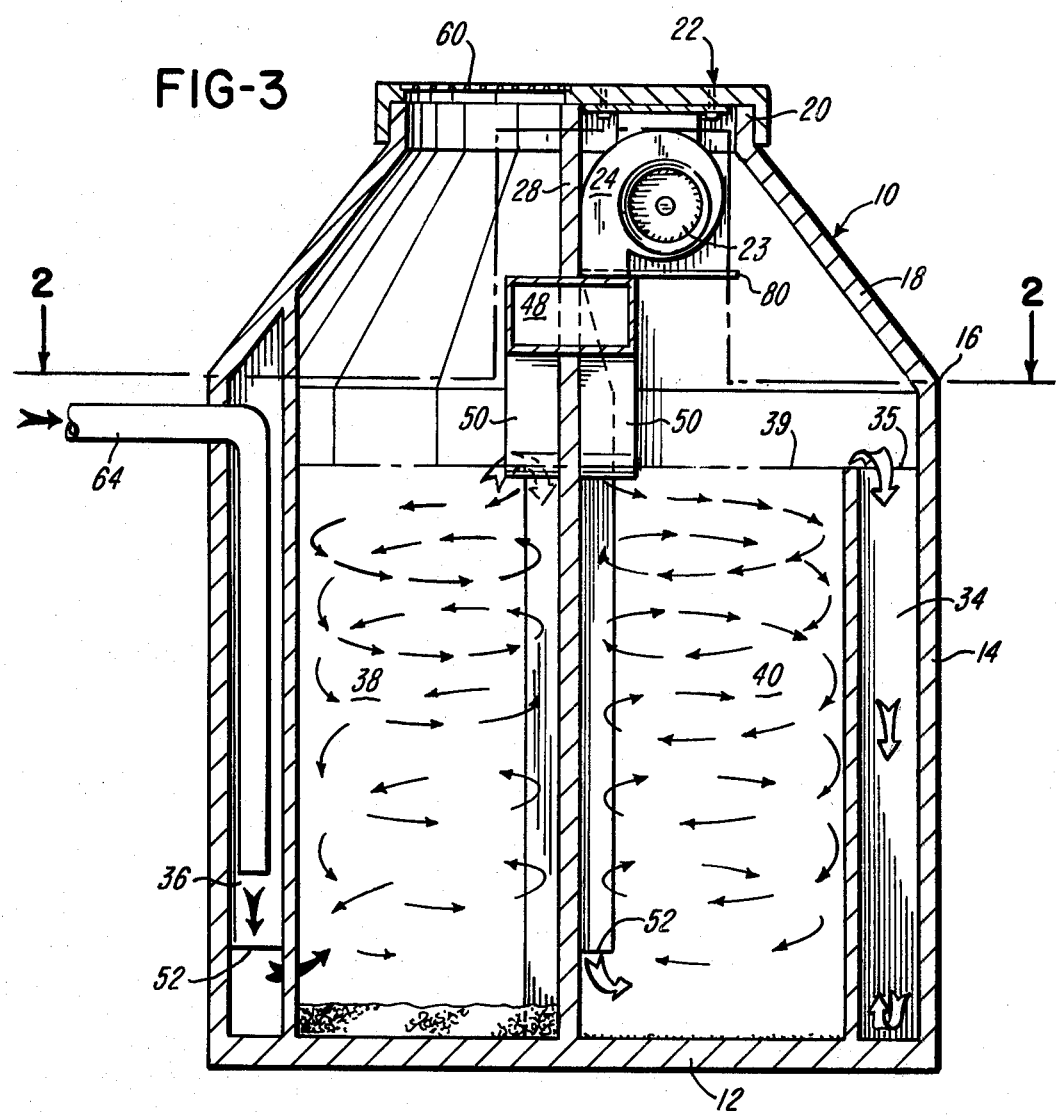
FIG. 3 is a vertical section of the apparatus of FIG. 1 and FIG. 2.

Viewing FIG. 2 of the drawings, it may be seen the outlet 51 at the lower end of each of the nozzles 50 defines an opening which is shallow in vertical depth and enlarged in a horizontal sense. In accordance with the invention the preferred ratio of the lateral extent of the nozzle discharge opening to its vertical extent will be in the neighborhood of 3:1 or 4:1, depending on the application. It will also be seen, in each case, the nozzle 50 directs its discharge adjacent and generally parallel to one radially oriented side wall portion of the chamber into which it projects, and the side wall portion along which the discharge is effected is in each case the side wall 28 or 32, nozzles being arranged in pairs and respectively to either side thereof. Also, in each case, the lower end of the plate extension 36 is arranged to define an opening 52 at or in the bottom thereof so sewage material introduced in the upper end of the entrance passage 33 of which it defines a part may move into the bottom of the interior of the related chamber.

The passage 33 for entrance of material to each of the chambers 38, 40, 42, and 44 is in each case defined by divergent plate structures 34 and 36 and the portion of wall structure 14 which they intercept and the discharge opening therefrom is the opening 52 at one side and to the lower end of its vertical extent. The introduction of material to each of the entrance passages leading to the chambers 40, 42 and 44 is by way of overflow into the upper open end thereof.

Figure 4:
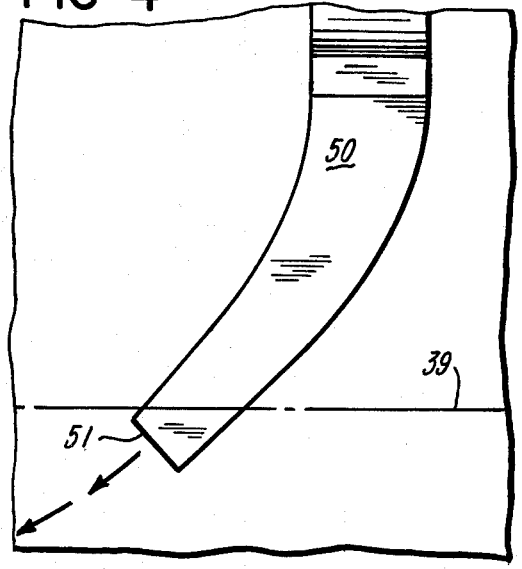
FIG. 4 is a detail view illustrating the special angle and position of application of the discharge ends of the nozzles utilized in the apparatus of FIGS. 1-3.

Referring once more to the nozzles 50, as seen in FIG. 4 there is a bend in each nozzle to angle its discharge end portion to open not only downwardly along the adjacent partition wall but in the direction of the inner surface of the wall structure 14. The disposition of each nozzle provides that its discharge end, including its outlet 51, will be submerged in the upper level of the sewage contents into which it projects to lie below this surface a distance which is not appreciably more than 1" and preferably in a range between about $\frac{5}{8}$" and $\frac{7}{8}$". In the case illustrated, the discharge end of each nozzle, below its curve or bend, is disposed at an angle to the upper level of the sewage or derivative material in which it is submerged which is preferably between about 40° and about 42½°. As will be described, such an angle has important benefits and should be so limited though it may be acceptable in certain cases should this angle lie between about 37½° and about 45°.

Plate segments fixed over the wall structure bounding the upper limit of chamber 40 and about the blower outlet define a baffle arrangement 80. This baffle arrangement is located under the blower 24 and over radially innermost portions of chambers 40, 42 and 44. It serves as a spray deflector which prevents sewage spray lifting from the sewage contents of the chambers 40, 42 and 44 from entering the air circulated and recirculated about the blower and drawn thereto. The benefit of this is believed obvious.

The blower is mounted to the plate 22 by bolts which provide for its vertical adjustment and that of its connected structure, including the baffle arrangement 80, if and when an incremental vertical adjustment of the nozzle outlets 51 is required.

The vertical plate extensions 26' and 28' will be suitably formed to accommodate the projection therethrough of portions of the structure defining the chamber 48 and nozzles 50, as well as the baffle arrangement 80, as required by the centering thereof over the partitions defining the chambers 38, 40, 42 and 44.

The blower may be an ordinary inexpensive unit of a conventional nature. Neither its detail nor that of the connecting structure is described since the construction thereof is believed obvious and is certainly not limited by the representation thereof diagrammatically shown in the accompanying drawings. The important feature is the nature and disposition of the nozzles through which air under pressure developed in the blower may be discharged to achieve the unobvious results which are characteristic in use of the present invention.

Referring to FIG. 1 the whole quadrant of the cap plate 22 which overlies the chamber 38 is apertured and indicated in general by the numeral 60.

To render the apparatus and system of the invention complete for the operation thereof an influent pipe line 64 is directed into the upper end of the entrance passage 33 of the chamber 38 above a level 39, which is commonly defined by the uppermost edges or lips of the plate structures 34 forming part of the bounding wall structure of the chambers 38, 40 and 42, and then down the vertical extent of this passage to discharge into the bottom of chamber 38 by way of the outlet 52. It will be seen from FIG. 2 that the level 39 is adjacent to but below the level 16. The plate structure 34 forming part of the wall structure bounding the chamber 44 extends upwardly of the level 39 for reasons which should be obvious.

Inserted through an opening in the wall structure 14 to project inwardly of the chamber 44 is an effluent line 66. The entrance end of the effluent line, and the opening thereto, are arranged to be partially submerged in the contents of the chamber 44, the upper limits of which is to be essentially maintained at the level 39, so as to enable the line to receive and discharge therethrough such contents of the chamber 44 as rise to and above the level 39.

Hinged to the entrance end of the effluent line 66, which positions in adjacent spaced relation to the partition wall section 32, is a cap element 67. In operation of the invention system the cap 67 is normally biased from the entrance opening to the effluent line by the pressured flow of air issuing from the adjacent nozzle 50. This bias is effected by the air pressuring a portion of the surface layer of the chamber contents against a tab 69 in connection with the cap 67. The cap 67 has an aperture which is bridged by a filter material 68 the purpose of which will be further described.

In use of the apparatus above set forth, raw sewage is introduced in the first instance by way of the influent line 64 and the entrance passage 33 into which it projects to pass to the bottom of the chamber 38 by way of the opening 52 in or at the lower end of its entrance passage wall section 36. As raw sewage enters the chamber 38 immediately of its bottom, the heavier than water solids content thereof automatically deposits on its bottom while the liquid or water portion of the sewage, including the lighter than water solids suspended therein, rises upwardly of the chamber 38 to the level 39. As previously indicated, the level 39 is essentially in the plane of the overflow lip 35 of the wall section 34 bounding the opening at the upper end of the entrance passage leading to the bottom of the chamber 40.

When the sewage treatment commences, the blower 24 is energized by suitable means to direct a pressured flow of air to and through each of the nozzles 50. As the level of the liquid content of the sewage in chamber 38 rises to the level 39, it slightly submerges, in the amount previously stated, the outlet 51 of the nozzle which projects into the chamber 38. The compressed air developed by the blower issues from the nozzle in a relatively flat layer and a highly pressured jet form having a dual function. By reason of the angle of the discharge end of the nozzle to the upper surface of the sewage, as previously stated, the air issuing from its slightly submerged outlet does so in a controlled sheet-like laterally extended pattern which moves under the relatively shallow layer of the sewage thereabove and lifts a portion thereof in a vertical sense and to a substantial level of elevation. This lifting force has been found to be of such a nature and the sewage lifted so high that it tends to break down into a spray form comprised of multitudes of small bubbles and widely separated particles into which the applied air supplies oxygen by infusion. Tests have shown that the exposure of the lifted sewage content is such that substantial amounts of oxygen in the air applied are infused in the sewage, which is thereby oxygenated. When the lifted relatively liquid sewage so oxygenated falls back into the main body of the contents of the chamber 38 it lends itself to the achievement of a most rapid and effective aerobic digestion of the embodied solids.

Enhancing the oxygenation procedure, which is very rapid and highly efficient, is the ability of the jet flow of air under pressure, by reason of the angle at which the nozzle 50 is submerged in the upper layer of the contents of the chamber 38 and the shape of the outlet 51, to induce a special rotational influence on the body of sewage to which it is applied. This rotational influence is reflected by an induced current produced at and below the level of the air discharged which has a downwardly spiralling pattern. There is no agitation of the sewage contents, only a controlled movement of current in the body thereof. The current has a relatively high velocity adjacent the top of the sewage but this velocity gradually reduces in the downward spiral of the current until at a level adjacent and above the solids at the bottom of the chamber 38 it is so reduced that it does not visibly disturb the solids and keeps them down. Uniquely affected by this induced current and the velocity gradient thereof, the lighter than water solids suspended in the relatively liquid (essentially water) portion of the sewage are pressured to move constantly downward within the liquid until they reach and are co-mingled with the solids at the bottom of the chamber 38. In very short order following the commencement of the sewage treatment the liquid at the upper level of the contents in chamber 38 is essentially free of color, relatively clear and embodies therein only a relatively nominal amount of suspended solids. As a matter of fact the solids that remain are not distinctly visible as such. By reason of further incoming sewage the relatively clear liquid developed at the upper layer of chamber 38 rises above the level 39 and overflows the lip 35 of the adjacent wall segment 34 at the entrance opening at the upper end of the passage 33 leading to the chamber 40.

Tests have shown that this liquid which flows into the chamber 40 will be water containing at most 10% to 20% of the solids that originally enter the chamber 38. Thus 80% to 90% of the solids in the sewage that enters chamber 38 ends up at the bottom thereof. By reason of the unexpectedly high degree of oxygenation achieved and the driving of solids to the bottom of chamber 38 the aerobic digestion of the solids is rapid and the solids are reduced to a minimal volume of sludge in short order.

The solids left in the liquid entering the chamber 40 include to a large degree, colloidal solids. It is significant to note that the extent to which dissolved oxygen occurs in the procedure in chamber 38 provides that the liquid flow to the chamber 40 has its dissolved oxygen content increased to over 300% of that which existed in the influent entering chamber 38. Moreover, the solid content of the liquid entering the chamber 40 is not distinguishable from a visual standpoint.

The nozzle 50 applied to the contents in chamber 40 has its discharge end angled and its outlet 51 slightly submerged as described with reference to the nozzle 50 which projects in the contents of chamber 38 and similarly functions. Thus a flat but wide thin layer jet of air issues from the nozzle not more than about one inch below the upper surface of the body of derivative sewage contents to which it is applied to lift upper layer portions of the contents in a very high spray-like configuration for additional infusion of oxygen deriving from the applied air. Again, as the oxygenated portions of the chamber contents as well as other solids, visible and otherwise, suspended in such contents come under the influence of the downward spiralling current produced by the jet air flow as previously described, they are pressured downwardly to the bottom of the chamber 40. The solids reaching the bottom of the chamber 40 are rapidly treated by aerobic digestion, a result of the highly effective introduction of oxygen and the level thereof.

With the procedure applied in chamber 40 the upper level of the contents thereof will soon have no visible solids and be essentially clean as it rises and overflows from the chamber 40 into and down the entrance passage to the chamber 42. This overflow is quite safe for discharge to the environment. As a matter of fact, the discharge from the chamber 38 is relatively free of any content that might be dangerous if the same were discharged directly to the surrounding environment. The discharge is in either case free of offensive odor.

The nature, angle and location of the application of a pressured flow of air per the invention inhibits agglomeration, and insures thereby maximum oxygenation. In fact, the current effect is such to continuously reduce suspended solids as they are forced to the bottom of the chamber which they enter by reason of the downward spiral of the induced current. Since influent is directed to each chamber by way of its bottom, the invention system also avoids foaming and provides means to prevent grease or oil rising to the surface of the chamber contents.

The procedure followed in chambers 38 and 40 is successively repeated in chambers 42 and 44. The net effect in each case is an increase in the clarity and potability of the water received and discharged. The water discharged from chamber 44 by way of the effluent line 66 is extremely potable, has no evidence of suspended solids and is clear in character, ready for chemical treatment, if desired, and for recycling through a water system or discharge into streams with complete safety.

Thus, the invention system is effected in a manner to produce unobvious results as oxygen goes into molecular solution in the sewage and the derivative liquid, which is essentially water, to the extent required for a most effective respiration of the bacteria which function to consume the bio-degradable sewage solids. In respect to oxygenation, the spray effect here produced contrasts significantly with the splash procedure previously proposed for surface infusion of oxygen. The latter neither applies a sufficient amount of oxygen nor provides for a control of the sewage solids in a manner to produce acceptable results such as presently required for environmental protection.

The normally displaced cap plate 67 hinged to the entrance end of the effluent line is a fail safe device. It insures that if for any unexpected reason the invention air delivery system breaks down, this plate will close the entrance to the effluent line but will nevertheless pass liquid therethrough, if such is required, and filter out contained solids.

The apertured quadrant 60 of the cap plate 22 at the top of the tank 10 serves admirably for communication of the space above the contents of chamber 38 with the atmosphere and for movement of air therebetween. At the same time, the apertured area 46 provides access for air to move to the inlet 23 of the blower 24 while the remainder or unapertured portion of the plate 22 over the chambers 40, 42 and 44 serves as a baffle to induce recirculation of a substantial portion of the air which enters the space above these chambers. This recirculation maintains the chamber contents above freezing even under conditions of operation during severe winter ambient temperatures. Of course, the amount of aerobic digestion in use of the system causes a generation of more heat than normal, particularly in the chamber 38, adding to the all-weather capabilities of the system.

FIGS. 5 and 6 show a modification of the tank structure of FIGS. 1 to 4 wherein the neck or cylindrical collar 20 defining the opening at the top of the tank 10 is provided with an internal flange 70. This flange 70 is bridged by an assembly including two co-planar parallel strips of angle iron, 74 and 76. The strip 74 extends across a diameter of the opening to the tank 10 in spaced vertical alignment with the partitions including wall sections 26 and 30. The strip of angle iron 76 is spaced to one side and parallel to the section 74 and arranged to overlie chambers 40 and 42. Connected with and to the upperside of the blower base, in this modification, and suspended therewith by adjustable connector means, from the strips 74 and 76, is a baffle plate 78 having the form of a disc with a quadrant removed. The diameter of the 270° disc 78 is slightly less than that of the opening of the top of the tank 10 and it is centered and positioned therein so the area of its eliminated quadrant is over the top of the contents of the chamber 38. Fixed to and above the strips of angle iron 74 and 76 and over the top of the tank 10 therewith is an open mesh cover 72. The baffle plate 78 has a rectangular aperture 61 in its portion which overlies the chamber 42, serving to communicate the atmosphere with the inlet 23 of the blower 24.

It will of course be obvious that the movement of the baffle plate together with the blower is provided for to enable installation adjustments of the position of the nozzle outlets with respect to the surface of the sewage or derivative liquid thereunder. The adjustments will be made preferably to provide for the relationship of the air over the contents of the chambers thereunder to be composed of approximately 75% recirculated air and 25% fresh air at all times.

The cap plate modification of FIGS. 5 and 6 has a function identical with that of the embodiment of FIGS. 1 to 4, the baffle 78 serving the same function as the imperforate portion of this cap plate 22.

The above described parameters and construction exemplify various features of the present invention. Further, in this respect, particularly preferred embodiments of the invention will feature a dimensional ratio between the vertical dimension of the discharge extremity or outlet 51 of each nozzle and the distance which this discharge extremity or outlet is submerged below the upper surface of the sewage or derivative liquid in the chamber to which the nozzle is applied, which lies in a range between about 2 to 1 and about 2 to 3. When such limitations are observed, the spray of sewage produced in the function of each nozzle is optimal for maximum infusion of oxygen in the lifted sewage.

Another feature to be noted in the operation of invention embodiments is that the contents of each chamber 38, 40, 42 and 44 are arranged to rise to such a level as to produce on the bottom of the chamber thereof a hydraulic head pressure the extent of which is sufficient to break up inflowing solids such as fats, grease, soaps and detergents.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A sewage treatment system comprising means defining at least one chamber for receiving a body of sewage composed of liquid and solids the upper surface of which body is exposed to air, means for delivering air under pressure to first enter said body of sewage in said at least one chamber at a point slightly below the upper surface thereof comprising a nozzle structure with a generally rectangular outlet having a width greater than its height and at a downwardly directed angle to said upper surface to physically lift portions of said body from said upper surface in a spray form, thereby to disperse said lifted portions in the air above said upper surface in the form of finely divided liquid and solid fractions thereof and to infuse said fractions with oxygen for return therewith to said body under the influence of gravity to propagate aerobic digestion throughout said body.

2. The sewage treatment system of claim 1 wherein the outlet of said nozzle structure lies below the upper surface of said body of sewage a distance which does not appreciably exceed one inch.

3. The sewage treatment system of claim 2 wherein said outlet of said nozzle structure lies not less than about ⅜" below the upper surface of said body of sewage.

4. The sewage treatment system of claim 2 wherein the distance which said outlet of said nozzle structure lies below said upper surface of said body of sewage is in the range from about ⅜" to about ⅝".

5. The sewage treatment system of claim 1 wherein said nozzle structure has the ratio of the width to the height thereof in a range from about 3:1 to 4:1.

6. The sewage treatment system of claim 5 wherein the dimensional ratio between the height of said nozzle and the distance which said outlet lies below the upper surface of said body of sewage is in the range of between about 2 to 1 and about 2 to 3.

7. The sewage treatment system of claim 1 in which said air delivering means includes a nozzle the discharge end of which is inclined to said upper surface of said body of sewage at an angle within the range of about 37½° to 45°.

8. The sewage treatment system of claim 7 wherein said discharge end of said air delivering means is inclined to said upper surface at an angle between about 40° and about 42½°.

9. The sewage treatment system of claim 1 including means for introduction of raw sewage into said at least one chamber at the bottom thereof whereby heavier than water solids in said sewage tend to remain at the bottom of said at least one chamber and lighter than water solids tend to move toward said upper surface of said body of sewage to be suspended in the liquid thereof and said air applied under pressure is so angled upon entry to cause said body of sewage to rotate with a downwardly spiralling current therein having a decreasing velocity which at the lowermost level of said at least one chamber is insufficient to stir up heavier than water solids deposited on its bottom, said current causing suspended solids together with liquid sewage infused with oxygen to join to and settle with the heavier than water solids at the bottom of said at least one chamber, whereby aerobic digestion is stimulated to relatively rapidly reduce the solids in said at least one chamber to a minimal volume of sludge and leave the upper liquid surface of said body in said one chamber relatively cleared of any visibly perceptive sewage solids.

10. The sewage treatment system of claim 9 including means defining a second chamber and means communicating between said chambers providing delivery of said upper surface liquid portion of said body to said second chamber.

11. The sewage treatment system of claim 1 including means defining a second chamber, means communicating between said chambers to provide for the overflow from said first chamber into said second chamber, said second chamber including air delivering means discharging air to said body of sewage immediately below the upper surface thereof to lift upper surface portions thereof in a spray which disperses said body of liquid into small fractions exposed to air above said second chamber, thereby oxygenating said fractions which fall back into the liquid in said second chamber and propagating aerobic digestion of the contents thereof, said air applied in the liquid in said second chamber being angled to the upper surface thereof to produce within the body of the liquid in said second chamber a downwardly spiralling current driving remaining suspended solids toward the bottom of said second chamber.

12. The sewage treatment system of claim 11 including means defining a third chamber, means communicating between said second and third chambers to provide for the overflow of the upper surface portion of the liquid in said second chamber to said third chamber, said third chamber including air delivering means discharging air under pressure to said body of liquid immediately below the upper surface portion thereof to lift upper surface portions thereof in a spray, said air being angled to the upper surface of the body of liquid to produce a downwardly spiralling current within the liquid in said third chamber to separate and drive to the bottom of said third chamber essentially all remaining solid elements in the liquid above the bottom of said third chamber, and to leave at the top thereof essentially potable water.

13. The sewage treatment system of claim 12 wherein said chambers commonly occupy a single receptacle structure sharing common walls, and including means to direct the overflow from each chamber to the bottom of the next chamber.

14. The sewage treatment system of claim 13 wherein said receptacle structure includes a fourth chamber having means to direct overflow from said third chamber to the bottom of said fourth chamber said fourth chamber including means for discharging air into the liquid in said fourth chamber immediately below the upper level thereof at an angle to lift upper portions thereof in a spray.

15. The sewage treatment system of claim 14 including an effluent line to direct liquid from the upper surface portion of the contents of the last of said chambers out of said system the inlet of which has a cap normally held open by the influence of a portion of the air delivered immediately below the surface of the contents of the chamber.

16. The sewage treatment system of claim 15 wherein said cap constitutes a filter, permitting the delivery of liquid through said effluent line should the air applied fail to hold the cap open.

17. The sewage treatment system of claim 14 including baffle means spaced above the upper surface of the body of liquid in chambers following the first chamber, blower means provided in connection with said baffle means and said nozzle, said blower means being operable to direct said air under pressure to and through said nozzle and said baffle means inducing a circulation and recirculation of air above the contents of said following chambers, said blower means having an inlet in communication with the atmosphere to draw fresh air thereto and arranged to provide a ratio of 75% recirculated air to 25% new fresh air in the space above the contents of said following chambers.

18. The sewage treatment system of claim 13 wherein said receptacle structure has a cover including openings through which the upper surface of the body of sewage is exposed to the atmosphere.

19. The sewage treatment system of claim 11 wherein air from said air delivering means to said first and second chambers is commonly furnished from the outlet of a single blower.

20. A sewage treatment system comprising at least one chamber for receiving a body of sewage composed of liquids and solids, means for delivering air under pressure to first enter said body of sewage at a point below the upper surface thereof at an angle to said upper surface to lift portions of said body of sewage from the upper surface in a spray form and to cause said body of sewage to rotate with a downwardly spiralling current therein to force suspended solids to the bottom of said chamber, said air delivering means comprising a nozzle with a generally rectangular outlet having a width greater than its height and angled downwardly into said body of sewage.

* * * * *

UNITED STATES PATENT AND TRADEMARK OFFICE
CERTIFICATE OF CORRECTION

PATENT NO. : 4,306,968

DATED : December 22, 1981

INVENTOR(S) : Kenneth J. Yost

It is certified that error appears in the above—identified patent and that said Letters Patent is hereby corrected as shown below:

Col. 1, line 51, "oxygenation is" should read --oxygenation achieved is--.

Col. 6, line 42, first occurrence, "5/8" should be --3/8--.

Signed and Sealed this

Twenty-second Day of June 1982

[SEAL]

Attest:

*Attesting Officer*

GERALD J. MOSSINGHOFF

*Commissioner of Patents and Trademarks*